(12) United States Patent
Melin et al.

(10) Patent No.: US 8,699,833 B2
(45) Date of Patent: Apr. 15, 2014

(54) MICROSTRUCTURED OPTICAL FIBER AND A DEVICE FOR GENERATING BROADBAND WHITE LIGHT

(75) Inventors: Gilles Melin, Orsay (FR); Simon Lempereur, Villejuif (FR); Anne Fleureau, Grez sur Loing (FR); Vincent Couderc, Verneuil sur Vienne (FR); Philippe Laproux, Saint Pardoux (FR); Alexandre Kudlinski, Salomé (FR)

(73) Assignee: Draka Comteq B.V., Amsterdam (NL)

( * ) Notice: Subject to any disclaimer, the term of this patent is extended or adjusted under 35 U.S.C. 154(b) by 204 days.

(21) Appl. No.: 12/855,116

(22) Filed: Aug. 12, 2010

(65) Prior Publication Data

US 2011/0194812 A1 Aug. 11, 2011

(30) Foreign Application Priority Data

Aug. 14, 2009 (FR) .................................... 09 03977

(51) Int. Cl.
*G02B 6/26* (2006.01)

(52) U.S. Cl.
USPC ................................................ 385/27; 372/6

(58) Field of Classification Search
USPC ................................................ 385/27; 372/6
See application file for complete search history.

(56) References Cited

U.S. PATENT DOCUMENTS

| | | | | |
|---|---|---|---|---|
| 5,798,631 A * | 8/1998 | Spee et al. | ........................ | 322/25 |
| 5,960,146 A * | 9/1999 | Okuno et al. | ................. | 385/122 |
| 6,097,870 A * | 8/2000 | Ranka et al. | ................... | 385/127 |
| 7,116,469 B2 * | 10/2006 | Bragheri et al. | ............... | 359/334 |
| 7,266,275 B2 * | 9/2007 | Hansen et al. | ................. | 385/125 |
| 7,286,738 B2 * | 10/2007 | Yamada | ......................... | 385/122 |
| 2002/0041618 A1 * | 4/2002 | Watanabe et al. | ............... | 372/76 |
| 2003/0044158 A1 * | 3/2003 | King et al. | ..................... | 385/142 |
| 2004/0105640 A1 * | 6/2004 | Hasegawa | ...................... | 385/125 |
| 2005/0213905 A1 * | 9/2005 | Yamada | ......................... | 385/122 |
| 2005/0225841 A1 * | 10/2005 | Bragheri et al. | ............... | 359/334 |
| 2005/0238307 A1 * | 10/2005 | Hansen et al. | ................. | 385/125 |
| 2008/0226242 A1 * | 9/2008 | Buchter et al. | ................ | 385/122 |

(Continued)

FOREIGN PATENT DOCUMENTS

| | | |
|---|---|---|
| WO | 2008067823 A1 | 6/2008 |
| WO | 2009098519 A1 | 8/2009 |

OTHER PUBLICATIONS

Schuster et al., "Microstructured fibers with highly nonlinear materials," Dec. 12, 2007, Opt Quant Electron (2007) 39: 1057-1069.*

(Continued)

*Primary Examiner* — Charlie Peng
*Assistant Examiner* — Peter Radkowski
(74) *Attorney, Agent, or Firm* — Shumaker, Loop & Kendrick, LLP (57) ABSTRACT

A microstructured optical fiber for generating broadband white light having a core doped with germanium and silica cladding surrounding the core, the cladding including a plurality of holes arranged in the form of a regular mesh, wherein the diameter F of a hole in the cladding, the pitch L between the respective centers of two neighboring holes in the cladding, and the refractive index difference Dn between the germanium-doped fiber core and the silica of the cladding are such that the fiber can generate white light on the fundamental mode over a wavelength band having a width of at least 1000 nm.

13 Claims, 3 Drawing Sheets

(56) References Cited

U.S. PATENT DOCUMENTS

| | | | |
|---|---|---|---|
| 2009/0129409 A1* | 5/2009 | Hirano et al. | 372/6 |
| 2009/0274427 A1* | 11/2009 | Miyabe et al. | 385/125 |
| 2009/0316732 A1* | 12/2009 | Metivier et al. | 372/6 |

OTHER PUBLICATIONS

Kudlinski et al., "Zero-dispersion wavelength decreasing photonic crystal fibers for ultraviolet-extended supercontinuum generation," Optics Express, vol. 14, Issue 12, pp. 5715-5722, May 2006.*

Schuster et al., "Microstructured fibers with highly nonlinear materials,", Opt Quant Electron (2007) 39: 1057-1069, Dec. 12, 2007.*

Cascante-Vindas et al.,"Ge-doped Y-shaped microstructured fiber for supercontinuum generation," Proc. SPIE 7357, Photonic Crystal Fibers III, 735708, May 19, 2009.*

Cascante-Vindas et al.,"Supercontinuum generation in highly Ge-doped core Y-shaped microstructured optical fiber," J Applied Physics B, V 98, N 2-3, p. 371-376, Feb. 2010.*

Kudlinski et al.,"Zero-dispersion wavelength decreasing photonic crystal fibers for ultraviolet-extended supercontinuum generation," Optics Express, vol. 14, Issue 12, pp. 5715-5722, May 2006.*

French Patent Office Search Report for Patent Application No. FR 09/03977, dated Apr. 8, 2010.

Kay Schuster et al; "Microstructured Fibers with Highly Nonlinear Materials"; Optical and Quantum Electronics, Kluwer Academic Publishers, BO, vol. 39, No. 12-13, Dec. 12, 2007, pp. 1057-1069, XP019612817; ISSN: 1572-817X.

Kazuhide Nakajima et al: "Dopant Dependance of Effective Nonlinear Refractive Index in Ge02 and F-Doped Core Single-Mode Fibers" IEEE Photonics Technology Letters, IEEE Service Center, Piscataway, NJ, US, vol. 14, No. 4, Apr. 1, 2002, XP011067057; ISSN: 1041-1135.

Kudlinski A et al: "Disperson Decreasing Photonic Crystal Fiber for UV-Enhanced Supercontinuum Generation", Leos Summer Topical Meetings, 2006 Digest of the Quebec City QC, Canada, Jul. 17-19, 2006, Piscataway, NJ, USA, IEEE, Jul. 17, 2006, pp. 54-55, XP010940154, ISBN: 978-1-4244-0090-4.

* cited by examiner

MICROSTRUCTURED OPTICAL FIBER AND A DEVICE FOR GENERATING BROADBAND WHITE LIGHT

CROSS-REFERENCE TO RELATED APPLICATIONS

This application claims priority to French patent application Ser. No. 09/03977 filed Aug. 14, 2009, the contents of which are incorporated by reference herein.

TECHNICAL FIELD AND BACKGROUND OF THE INVENTION

The invention relates to the field of generating broadband white light. The devices used generally comprise a microstructured optical fiber of structure that is adapted to generate white light, the fiber being fed by a coherent light source emitting at a given wavelength.

Microstructured optical fibers are also known as photonic crystal fibers (PCF), holey fibers or hole-assisted fibers.

In general, the coherent light source used is a laser, emitting light pulses at a certain repetition frequency.

Microstructured optical fibers are generally constituted by cladding in which there is a fiber core surrounded by microstructures.

In a cross-section of the fiber, these microstructures are formed by holes, each extending along the fiber and arranged in a particular layout, which layout is characterized in particular by the diameter of the holes and the pitch between the centers of two neighboring holes.

The fiber core may be made of a material that is different from that of the cladding, however it is usually made from the material of the cladding, with the shape of the fiber core being determined merely by the presence of the holes that surround it.

Microstructured optical fibers provide numerous advantages compared with conventional optical fibers, which are constituted by a fiber core made of doped silica, said core being surrounded by cladding having a refractive index that is slightly lower than that of the fiber core.

The large difference in refractive index between the core (made of silica or doped silica) and the cladding (made of silica with air holes) makes it possible to design microstructured optical fibers with a core diameter that is very small.

Furthermore, microstructures provide numerous design options.

Within a section of a microstructured optical fiber, it is possible to modify hole diameter, pitch between neighboring holes, the type of mesh formed relative to one another by the holes (triangular, hexagonal, etc. . . . , mesh), and also the shape and the outside dimension of the structure formed by the set of holes.

In addition, it is also possible to cause certain geometrical characteristics to vary along the microstructured optical fiber in order to obtain certain properties. For example, it is possible to cause the diameter of the core to vary along the fiber by modifying the outside diameter along the fiber. This adaptation is commonly referred to as "tapering", and sometimes as "conicity".

Advantage has thus been taken of the dimensioning options made available by microstructured optical fibers for the purpose of generating broadband white light, also referred to as a "supercontinuum".

For example, the small diameters of microstructured optical fiber cores compared with the diameters of conventional optical fiber cores enhance non-linear phenomena. Such non-linear phenomena are sought after when it is desired to generate white light.

By way of example, the applications that can be envisaged with a broadband white light source include confocal fluorescent microscopy, flux cytometry, spectroscopy, tomography, inspecting semiconductors, or characterizing optical fibers.

In order to enhance the generation of broadband white light, various techniques have already been proposed.

One technique used for making it easier to obtain broadband white light is to enhance highly non-linear behavior by doping the core of a microstructured optical fiber.

In this respect, germanium doping is particularly advantageous.

With germanium doping, non-linear processes within the optical fiber are increased, by increasing both the non-linear refractive index coefficient ($n_2$) of the fiber core and the Raman gain coefficient ($C_R$).

The non-linear refractive index coefficient $n_2$ is involved in defining the non-linear coefficient g of the fiber, using the following relationship:

$$\gamma = 2\pi n_2 / \lambda S_{\mathit{eff}} \tag{R1}$$

where l is the wavelength under consideration and $S_{\mathit{eff}}$ is the effective area of the microstructured optical fiber for the propagation mode under consideration.

The influence of germanium doping in an optical fiber core on the non-linear refractive index coefficient is disclosed for example in the document "*Dopant dependence of effective non-linear refractive index in Ge and F doped core SMF*", by K. Nakajima, Photonics Technology Letters, Vol. 14, Issue 4, pp. 492-494, April 2002.

Increasing the non-linear refractive index coefficient contributes to increasing non-linear effects such as cross-phase modulation, self-phase modulation, or four-wave mixing.

A high Raman gain coefficient represents a high rate of energy transfer from the incident pump wave to the light conveying the optical signal. Simulated Raman diffusion enables the light serving to convey the optical signal to be diffused from the incident energy of the pump wave.

It should be observed that stimulated Raman diffusion can be observed regardless of the pump wavelength.

Stimulated Raman diffusion gives rise to a wavelength shift between the pump wave and the light conveying the optical signal. This shift may take place towards longer wavelengths (red shift also referred to as Stokes shift).

The use of a microstructured optical fiber having its core doped with germanium to obtain a Raman amplifier is described for example in U.S. Pat. No. 7,136,559.

Nevertheless, U.S. Pat. No. 7,136,559 does not specifically describe a broadband white light generator.

However it has been suggested that microstructured optical fibers with a core that can be doped with germanium might be used for obtaining light presenting a spectrum that extends over an enlarged band of wavelengths.

This applies for example to document US 2004/0105640. US 2004/0105640 describes a microstructured optical fiber comprising first cladding having holes of a first diameter surrounding the fiber core and second cladding provided with holes of a second diameter, which holes are arranged in the form of a regular mesh around the first cladding.

That structure enables low chromatic dispersion to be obtained over an enlarged band of wavelengths, with an effective area that is small, and without implementing holes that are too small.

The results described show that microstructured optical fibers make it possible, at their outlets, to obtain light of spectrum that covers the band 1200 nanometers (nm) to 1700 nm using a light source that emits at 1550 nm and in the absence of any doping. Nevertheless, no result is described for a microstructured optical fiber that is doped.

The same applies to document US 2005/0238307. That document proposes a microstructured optical fiber that likewise enables light to be obtained that is spread over an enlarged band of wavelengths, typically over the range 1200 nm to 1700 nm.

The light source emits at a wavelength of 1550 nm, that matches the zero dispersion wavelength $l_{ZDW}$ of the fiber. The zero dispersion wavelength (no chromatic dispersion) is the wavelength at which the dispersion effects associated with the material forming the core of the optical fiber cancel the effects of guidance dispersion, which wavelength depends in particular on the diameter of the fiber core.

To this end, US 2005/0238307 proposes a structure comprising first cladding with elements surrounding the fiber core and second cladding having holes that are arranged in the form of a regular mesh around the first cladding. The elements of the first cladding present a refractive index lower than the refractive index of the core but higher than the refractive index of the holes in the second cladding.

With that structure, the refractive index around the core is increased in comparison with a structure that does not include first cladding.

Consequently, the slope of the variation in chromatic dispersion around the zero dispersion wavelength is reduced, thereby making it possible to obtain a fiber with dispersion that is zero or close to zero over a wider band of wavelengths.

Unlike document US 2004/0105640, document US 2005/0238307 presents a variant of the microstructured optical fiber structure that has a fiber core that is doped with germanium.

In that variant, the elements of the first cladding and the holes in the second cladding are similar, containing air or a vacuum, and they are arranged in such a manner that d/A lies in the range 0.44<d/A<0.56, where d is the hole diameter and A is the spacing between two neighboring holes, A lying in the range 1.24 micrometers (µm) to 1.61 µm. This produces a structure that is simpler, in which the first cladding presenting elements with a suitably selected refractive index is omitted in favor of doping the core with germanium, thereby also having the effect of increasing the refractive index of the fiber core.

In addition, US 2005/0238307 specifies that the microstructured optical fiber doped in that way with germanium presents behavior in which the fundamental mode is confined within the fiber core at the wavelength l=1550 nm. Insofar as light propagation takes place in the fundamental mode, the broadband white light coming from the optical fiber is of good quality.

That result complies well with the available theoretical data when the fiber presents linear behavior, when the pump wavelength of 1550 nm is relatively high, and when the ratio d/A is relatively low, thus enhancing propagation on the fundamental mode.

The germanium-doped microstructured optical fiber proposed in US 2005/0238307 thus makes it possible to obtain good quality light at the outlet from the fiber (propagating on the fundamental mode), but over a bandwidth that remains limited to the range 1200 nm to 1700 nm.

Nevertheless, it has been possible to obtain a source of white light presenting a broader bandwidth, e.g. over the range 500 nm to 1700 nm, when using a germanium-doped microstructured optical fiber.

By way of example, one such microstructured optical fiber is disclosed in "*Microstructured fibers with highly non-linear materials*" by Schuster et al., Opt. Quant. Electron (2007), 39: pp. 1057-1069.

For this purpose, Schuster et al. propose doping the fiber core at a very high concentration, with the maximum refractive index difference between the doped fiber core and the silica of the cladding being greater than $55'10^{-3}$. This enhances non-linear effects in the fiber, and consequently assists in obtaining a spectrum of enlarged width at the outlet from the optical fiber.

Furthermore, the microstructured optical fibers that were tested presented a ratio d/L (where d is the diameter of the hole and L is the pitch between respective centers of two neighboring holes) that was likewise high, such that 0.87<d/L<0.9.

Given these characteristics (high doping level, high d/L ratio), the diameter of the fiber core is too great to enable propagation on a single mode. The white light obtained at the outlet from the optical fiber thus propagates on a plurality of propagation modes.

Schuster et al. appear to present such propagation on a plurality of modes as a consequence of the very high level with which the optical fiber core is doped with germanium that is of interest for the purpose of generating a broadband white light spectrum, with this taking advantage of the blue shift of the zero dispersion wavelength with increasing propagation mode order.

Nevertheless, it can be observed that the fact that the white light is generated on a plurality of propagation modes degrades the quality of the signal. The flatness of the power of the signal at the outlet from the optical fiber (FIG. 6 in Schuster et al.) is poor. For example, for the 80 µm fiber, flatness over the spectrum as a whole is about 10 decibels (dB) in the range 600 nm to 1700 nm. The level of flatness is greater than 10 dB for the fiber having a diameter of 125 µm, with two distinct power levels on either side of the pump wavelength. The signal at the output from the fiber is thus difficult to use as a white light source, and this applies to most of the applications that might be envisaged for using a broadband white light source.

By way of example, another technique that has been proposed is described in the document "*Zero-dispersion wavelength decreasing photonic crystal fibers for ultraviolet-extended supercontinuum generation*", by Kudlinski et al., Optics Express, Vol. 14, Issue 12, pp. 5715-5722, May 2006, which proposes a non-doped microstructured optical fiber and in which the diameter of the optical fiber core decreases along the fiber from an inlet value while conserving a constant void fraction (ratio of the overall section of the microstructures divided by the overall section of the optical fiber) all along said optical fiber.

The value of the diameter of the core of the microstructured optical fiber at its inlet is selected to initiate generation of the broadband continuous spectrum in a configuration where the zero dispersion wavelength is matched to the pump wavelength (i.e. about 1 µm in that example), which implies a certain diameter for the core of the optical fiber.

Thereafter, the decrease in the diameter of the core of the microstructured optical fiber ("taper") combined with conserving a constant void fraction all along the optical fiber makes it possible to decrease the zero dispersion wavelength along the fiber and to enhance the generation of wavelengths shorter than the pump wavelength so as to extend the bandwidth towards the blue and ultraviolet regions of the spectrum.

That other technique thus seeks to modify the effective area $A_{eff}$ of the microstructured optical fiber along the length of the fiber for the purpose of modifying the non-linear coefficient g of the fiber. The non-linear refractive index coefficient $n_2$ corresponds to that of non-doped silica.

That makes it possible to obtain a white light source with a bandwidth covering the range 350 nm to 1750 nm.

Furthermore, light propagates in the microstructured optical fiber on the fundamental mode over the entire width of the band. The white light obtained at the outlet from the fiber is thus of good quality.

BRIEF SUMMARY OF THE INVENTION

An object of the invention is to provide for a microstructured optical fiber that enables white light to be generated on the fundamental mode for a wavelength bandwidth of not less than 1000 nm.

Another object is to provide for a microstructured optical fiber that generates said white light on the fundamental mode for a wavelength bandwidth that covers the range 450 nm to 1700 nm.

Another object of the invention is to propose a device for generating white light that propagates on the fundamental mode over the entire bandwidth of the above-mentioned band.

Another object is to propose such a device that also makes it possible to generate white light while presenting a flat distribution of power over the entire width of the above-mentioned band.

One or more of the above-mentioned objects is achieved by the present invention by providing for a microstructured optical fiber for generating broadband white light, the fiber comprising a fiber core doped with germanium and silica cladding surrounding the fiber core, the cladding including a plurality of holes arranged in the form of a regular mesh, the fiber being characterized in that the diameter F of a hole in the cladding, the pitch L between the respective centers of two neighboring holes in the cladding, and the refractive index difference Dn between the germanium-doped fiber core and the silica of the cladding are such that $$0.6 \leq F/L \leq 1$$

$$3 \ \mu m \leq L \leq 6.5 \ \mu m,$$

and $$Dn = Dn_{max} * f(r)$$

with $Dn_{max}$, i.e. the maximum refractive index difference between the germanium-doped fiber core and the silica of the cladding, being such that $$10 \cdot 10^{-3} \leq Dn_{max} \leq 40 \cdot 10^{-3}$$

and f(r) being a function for the distribution of germanium doping within the fiber core depending on the radius r of said core, such that the fiber can generate white light on the fundamental mode over a wavelength band having a width of at least 1000 nm.

The clad optical fiber may also present at least one of the following characteristics, taken singly or in combination:
the fraction of the germanium-doped optical fiber core is such that $$0.5 \leq F_{doped}/F_{geo} \leq 1$$

where $F_{doped}$ is the diameter of the germanium-doped fiber core and $F_{geo}$ is the diameter of the fiber core, which diameter is defined as being the diameter of the circle tangential to the first ring of holes surrounding the fiber core;
the distribution function is defined by the relationship f(r)=1, such that the germanium is distributed uniformly over the diameter $F_{doped}$ of the doped fiber core;
the concentration of germanium is selected so that the refractive index difference $Dn=Dn_{max}$ between the germanium-doped fiber core and the silica of the cladding lies in the range $15 \cdot 10^{-3}$ and $25 \cdot 10^{-3}$, and is preferably about $20 \cdot 10^{-3}$;
the germanium is distributed non-uniformly;
the maximum refractive index difference $Dn_{max}$ between the germanium-doped fiber core and the silica of the cladding is such that $$25 \cdot 10^{-3} \leq Dn_{max} \leq 40 \cdot 10^{-3}$$

and preferably $$Dn_{max} = 32 \cdot 10^{-3};$$

and the distribution function f(r) is written $$f(r) = 1 - (2r/F_{doped})^2$$

where $$0 \leq 2r \leq F_{doped}$$

the diameter $F_{geo}$ of the fiber core decreases along the fiber over at least a portion thereof, with the ratio F/L being conserved all along the fiber; and
the ratio of the fiber core diameter at the outlet from the fiber over the fiber core diameter at the inlet to the fiber lies in the range 0.4 to 0.8, and is equal to 0.625, for example.

The invention also provides a device for generating broadband white light, the device being characterized in that it comprises:
a microstructured optical fiber according to the present invention; and
a coherent light source emitting light at a pump wavelength l of value that is matched to the zero dispersion wavelength $l_{ZDW}$ of the microstructured optical fiber, i.e. for which $l = l_{ZDW} \pm 50$ nm, so that it generates white light on the fundamental mode over a wavelength band having a width of at least 1000 nm.

The device may also present at least one of the following characteristics, taken singly or in combination:
the coherent light source emits ultrashort pulses, e.g. lying in the range 20 picoseconds (ps) to 3 nanoseconds (ns);
the pulses present peak power lying in the range 0.5 kilowatts (kW) to 200 kW, e.g. 9.5 kW;
the coherent light source emits pulses at a repetition frequency lying in the range 1 hertz (Hz) to 100 megahertz (MHz); and
the wavelength of the light source is 1064 nm, such that the device generates white light on the fundamental mode over a wavelength bandwidth occupying at least the range 450 nm to 1700 nm.

BRIEF DESCRIPTION OF THE DRAWINGS

The invention can be better understood and other objects, advantages, and characteristics thereof appear more clearly on reading the following description given with reference to the accompanying drawings, in which:

FIG. 1 comprises FIGS. 1a and 1b showing respectively a device for generating white light in accordance with the invention comprising a coherent light source feeding a microstructured optical fiber, and a cross-section view of the microstructured optical fiber;

FIG. 3, which comprises

FIG. 4, which comprises

FIG. 5, which comprises

DETAILED DESCRIPTION OF THE INVENTION

All of the microstructured optical fibers considered in the description below comprise a germanium-doped fiber core 21 with cladding 22 surrounding the fiber core 21, the cladding 22 including a plurality of holes arranged in the form of a regular mesh, with F designating the diameter of a hole and L the pitch between the respective centers of two adjacent holes.

The light source used with the microstructured optical fiber may be a pulse laser, emitting at a monochromatic wavelength.

Doping a fiber with germanium enhances non-linear effects, making it possible firstly to increase the non-linear coefficient g of the microstructured optical fiber by increasing the non-linear refractive index coefficients $n_2$, and secondly to increase the Raman coefficient $C_R$ of the fiber. By enhancing non-linear effects, it is easier to enlarge the spectrum of the light conveying the optical signal around the pump wavelength. The pump wavelength corresponds to the wavelength emitted by the light source.

Incidentally, germanium doping makes it possible to decrease the power of the light source needed for obtaining non-linear conditions.

The level of germanium doping that has been proposed for existing microstructured optical fibers remains relatively low, even though it is known that increasing the level of doping enhances the effectiveness of non-linear effects. It has been found that this type of doping is accompanied by a shift of the zero dispersion wavelength $l_{ZDW}$ towards longer wavelengths compared with the zero dispersion wavelength of an optical fiber having the same layout and not including germanium.

Unfortunately, such a shift towards the red is harmful when it is desired to be effective in generating a supercontinuum that is enlarged towards the blue. In order to compensate for the effect of the shift in the zero dispersion wavelength $l_{ZDW}$ towards the red, which is associated with the presence of germanium, a microstructured optical fiber of the invention presents high values for the ratio F/L of the diameter of a hole divided by the pitch L between the respective centers of two neighboring holes.

This solution goes against the teaching of the state of the art since, for the person skilled in the art, it implies obtaining a signal of degraded quality, with the signal propagating in the core of the fiber in a plurality of propagation nodes.

Nevertheless, it has been found that it is possible to obtain a germanium-doped microstructured optical fiber that presents a high F/L ratio and that is capable of generating a broadband spectrum on the fundamental mode.

Thus, in order to match the zero dispersion wavelength $l_{ZDW}$ to the pump wavelength, the following operations are performed:

a) a profile is initially defined for the distribution and the concentration of germanium in the core of the fiber;

b) thereafter, a value is set for the ratio F/L with which it is possible to envisage obtaining a zero dispersion wavelength that is matched to the pump wavelength, given the definition established in a); and c) then, a value is determined for the hole diameter F, that makes it possible actually to obtain a zero dispersion wavelength that is matched to the pump wavelength.

Incidentally, operation c) amounts to modifying the pitch L between the respective centers of two neighboring holes of the microstructured optical fiber, insofar as the ratio F/L has been set.

Furthermore, during step b), it is considered that the zero dispersion wavelength is matched to the pump wavelength when the zero dispersion wavelength is equivalent to the pump wavelength with an accuracy of ±50 nm.

A microstructured optical fiber has been fabricated and tested.

Figures 1A, 1B:
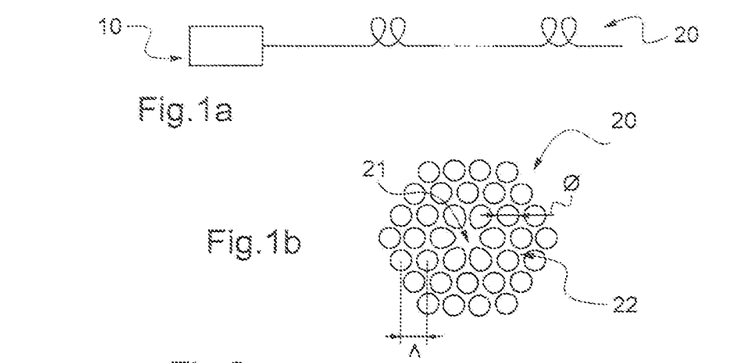

The profile of the fiber is shown in FIG. 1b, and its main characteristics are given in Table 1.

The holes are arranged in a regular mesh comprising, in this specific example, three rings of air holes centered on the core of the fiber.

The ratio $F_{doped}/F_{geo}$ that characterizes the diameter of $F_{doped}$ of the fiber core that is doped with germanium divided by the diameter $F_{geo}$ of the fiber core was selected to be 0.66.

As can be seen in FIG. 1b, the first ring of holes presents holes of a shape that is not perfectly circular, but that is slightly elongate (pear shaped). This is associated with fabrication constraints.

These constraints imply that the core diameter $F_{geo}$ presents a value that is smaller than its theoretical value, where its theoretical value can be determined by assuming that the holes of the first ring are perfectly circular in shape. In this example, the core diameter $F_{geo}$ of the fabricated optical fiber is given by $$F_{geo} = 3.85 \, \mu m$$

whereas its theoretical diameter is given by $$F_{geo,theo} = 2*L - F = 5.4 \, \mu m.$$

Germanium doping was performed with a non-uniform distribution so as to obtain a refractive index difference Dn between the core of the fiber 21 and the silica of the cladding 22 satisfying the relationship:

$$Dn = Dn_{max} * f(r)$$

where:
Dn$_{max}$ is the difference between the maximum refractive index of the fiber core and
the refractive index of the silica of the cladding 22, being given by Dn$_{max}$=32'10$^{-3}$; and
f(r)=1−2(r/F$_{doped}$)$^2$ is a function giving the distribution of germanium doping within the core of the fiber, depending on the radius r of said core, where 0≤2r≤F$_{doped}$ It should be observed that the diameter F$_{geo}$ of the fiber core is defined more precisely by the diameter of the circle that is tangential to the first ring of holes surrounding the fiber core.

The light source emits a wavelength of 1064 nm. To compensate for the effects of the zero dispersion wavelength shifting relative to the pump wavelength of 1064 nm (which shift is inherent to using germanium), the ratio F/L is selected to have a value of 0.86.

The layers of the doping then being set (Dn, F$_{doped}$/F$_{geo}$), as is the ratio F/L, the diameter F of a hole and thus the pitch L are determined to match the zero dispersion wavelength to the pump wavelength, i.e. to cause the zero dispersion wavelength to be equal to or as close as possible to the pump wavelength of 1064 nm, i.e. to lie in a range of values defined as 1064 nm±50 nm.

The value of the zero dispersion wavelength was determined by calculation and confirmed by experimental measurements, with the agreement between calculation and experimental measurements being ±10 nm. Experimental methods suitable for use in determining dispersion are known to the person skilled in the art. By way of example, they may involve an interferometer bench.

This led to defining a whole diameter F=4 μm and a pitch L=4.7 μm. Given the way the holes in the first ring deform, the diameter F of a hole is determined on a hole from any of the holes in the second or third rings. Furthermore, the pitch L is determined between the respective centers of two neighboring holes, neither of the two holes forming part of the first ring.

Furthermore, given the value l=1064 nm for the pump wavelength, this means that the ratio l/L is close to 0.25.

Furthermore, the present inventors have observed that a variation of ±10% in the pitch L gives rise to a variation of ±50 nm in the zero dispersion wavelength law. Thus, in order to match the zero dispersion wavelength to the pump wavelength of value l=1064 nm with the required accuracy (±50 nm), it is possible to envisage selecting a range for the pitch L that is defined by 4.7 μm to within ±10%, the ratio F/L being set at 0.86.

Figure 2:
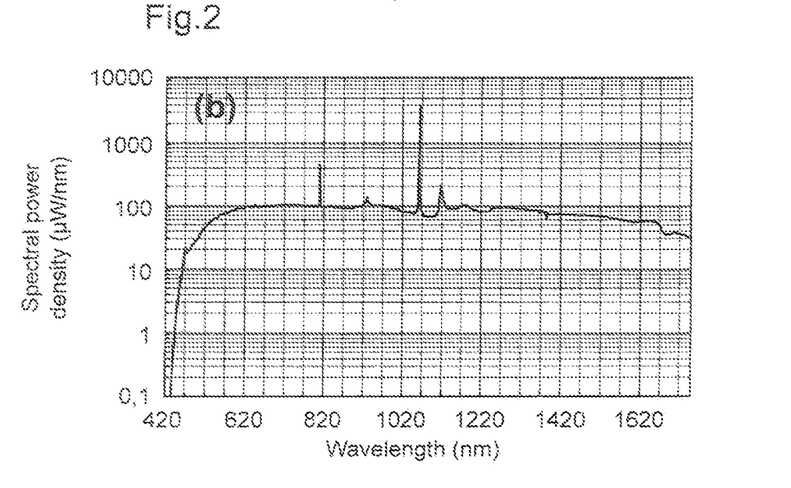
FIG. 2 shows how the spectrum density of the power obtained at the outlet from the microstructured optical fiber of FIG. 1 varies as a function of wavelength for a pump wavelength of 1064 nm.

The power spectrum density obtained at the outlet from the device of FIG. 1a comprising the microstructured optical fiber of FIG. 1b and of Table 1, is plotted in FIG. 2 as a function of wavelength.

To this end, the coherent light source 10 used was a laser producing a pump wave delivered to the microstructured optical fiber of FIG. 1 in the form of pulses of light at a repetition frequency of 30 kilohertz (kHz), each pulse being generated for a duration of 800 ps and with a peak power of 9.5 kW.

The peak power level concerned serves to ensure that the microstructured optical fiber of FIG. 1b operates under non-linear conditions. A boundary between linear behavior and non-linear behavior of the fiber can be defined by a peak power threshold value of 100 watts (W) per pulse for one meter of propagation in the fiber that possesses an effective area of a few square micrometers (μm$^2$). By way of information, the mean power of the source used for generating the pulses was 160 milliwatts (mW).

By way of example, given the properties of the light source 10 used, the following were obtained at the outlet from the microstructured optical fiber: a power spectrum density of 0.1 milliwatts per nanometer (mW/nm) at a wavelength of 620 nm; and a power spectrum density of 0.05 mW/nm at a wavelength of 1620 nm.

The mean power obtained at the outlet from the microstructured optical fiber was of the order of 90 mW.

The spectrum is very broad, lying more precisely over the range 450 nm to 1700 nm, with flatness of about 5 dB.

The experimental results of FIG. 2 thus show that the proposed microstructured optical fiber enables a broadband (450 nm to 1700 nm) white source to be generated with good power flatness at the outlet (5 dB over the above-mentioned wavelength band).

Figure 3A:
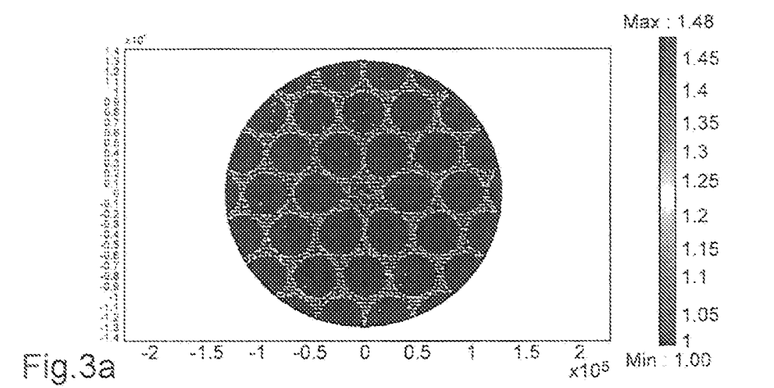
FIGS. 3a, 3b, and 3c, shows in FIG. 3a the layout of the microstructured optical fiber of FIG. 1b on the basis of the refractive indices of the materials with germanium doping, in FIG. 3b a calculation of the fundamental mode obtained with a pump wavelength of 1064 nm (LP01), and in FIG. 3c a calculation of higher order modes (LP11) that can be guided within the optical fiber, these calculations being performed under linear conditions.
Figure 3B:
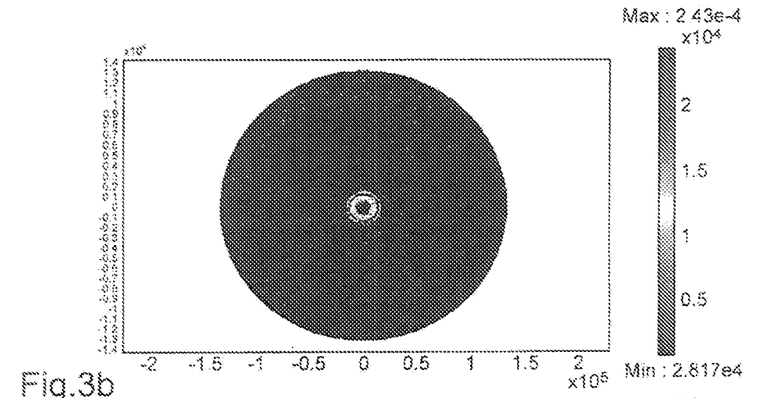
Figure 3C:
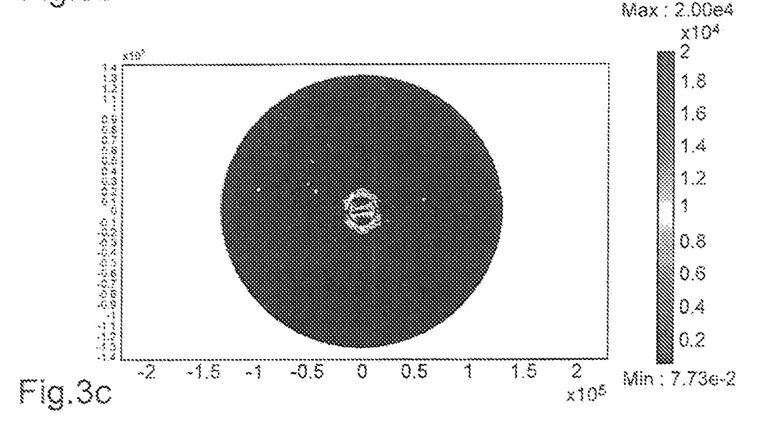

The mode behavior under linear conditions of the microstructured optical fiber shown in FIG. 1b and having the characteristics set out in Table 1 is shown in FIGS. 3a to 3c.

More precisely, FIG. 3a shows the layout of the cross-section of the microstructured optical fiber of FIG. 1b, the figure showing the refractive indices of the materials.

These refractive indices serve as input data for the calculations that gave the results that are shown in FIGS. 3b and 3c.

To perform the calculations, Maxwell's equations were used to determine a spatial distribution for the intensities of the propagation modes that can be guided, together with their effective indices.

In FIG. 3b, it can be seen that the calculations performed demonstrate that the fundamental mode (LP01) is propagated by the core of the fiber, and in FIG. 3c it can be seen that higher order modes (LP11) are also propagated by the core of the fiber.

The results of those numerical calculations are consistent with theoretical data, e.g. as given in "*Modal cutoff in microstructured optical fibers*", Kuhlmey, Optics Letters, Vol. 27 (19), Oct. 1, 2002, given that the microstructured optical fiber that is modelled in FIG. 3a is characterized by the ratios l/L≈0.25 and F/L≈0.85.

This means that selecting a pitch L lying in the range 3 μm to 6.5 μm does not make it possible, theoretically and under linear conditions, to obtain propagation that takes place solely on the fundamental mode over the entire range of wavelengths under consideration, i.e. 450 nm to 1700 nm.

Nevertheless, the experimental measurements taken on the microstructured optical fiber shown in FIG. 1b and having the characteristics set out in Table 1 show that the spectrum of FIG. 2 is in fact generated on the fundamental mode of the fiber over the entire range of wavelengths going from 450 nm to 1700 nm.

This result indicates a filtering effect on the modes propagated under non-linear conditions. The Applicant believes that this filtering effect might be associated with four-wave mixing phenomena.

Figure 4A:
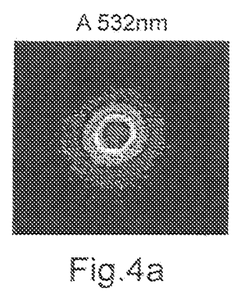
FIGS. 4a, 4b, and 4c shows experimental measurements of the power spectrum distribution at the outlet from the FIG. 1 fiber at different wavelengths under non-linear conditions.
Figure 4B:
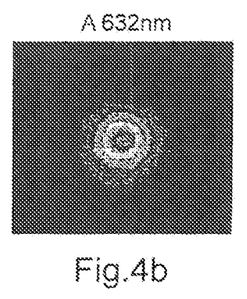
Figure 4C:
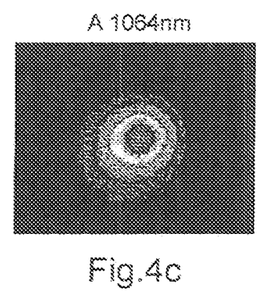

The experimental data is shown in FIGS. 4a, 4b, and 4c that are in the form of maps obtained using a camera showing the power at the outlet from the microstructured optical fiber at respective wavelengths of 532 nm, 632 nm, and 1064 nm. No measurements were taken beyond the value 1064 nm insofar as the behavior of the fiber tends towards monomode behavior with increasing wavelength.

In other words, it has been shown that the optical fiber and the device of FIGS. 1a and 1b make it possible under non-linear conditions to generate a spectrum on the fundamental mode, thereby providing an optical signal of good quality over the range of wavelengths under consideration (450 nm to 1700 nm).

In contrast, the theoretical data available for linear conditions indicates that the dimensioning implemented would lead to proposing a broadband white light source with relatively mediocre quality for the optical signal. Furthermore, the teaching of the state of the art indicates that, for a germanium-doped microstructured optical fiber (without taper), it is possible either to envisage generating good quality white light over a limited bandwidth (US 2005/0238307), or else to generate white light of degraded quality over a wider bandwidth (Schuster et al.).

Outside the specific association mentioned above between the coherent light source 10 and the microstructured optical fiber defined in Table 1, it is possible to envisage using a light source having other characteristics.

Thus, the light source could implement pulses at a repetition frequency lying in the range 1 Hz to 100 MHz, and more precisely in the range 1 Hz to 100 kHz if the laser is of the triggered type, and in the range 100 kHz to 100 MHz if the laser is of the mode locked type.

Each pulse may be generated over a duration lying in the range 20 ps to 3 ns.

The mean power of the light source may lie in the range 1 mW to 3 W, given that the important parameter remains the peak power of each pulse, since it is peak power that enables non-linear conditions to be obtained. The peak power of a pulse may generally lie in the range 0.5 kW to 200 kW.

The use of pulsed light makes it possible to obtain relatively high peak powers. Such power is difficult to obtain with a continuous light source. Furthermore, increasing the repetition frequency and decreasing the duration of the pulses increase the mean power density of the broadband spectrum that is generated.

In addition, outside the above-described example of dimensioning for the above-described fiber, the value of the ratio F/L may lie in the range 0.6 to 1, the value of the pitch L lying in the range 3 µm to 6.5 µm and the maximum refractive index difference $Dn_{max}$ between the core of the fiber and the silica of the cladding 22 lying in the range $$10'10^{-3} \leq Dn_{max} \leq 40'10^{-3}$$

The maximum value for the ratio F/L may be 0.9, 0.86, 0.85, or indeed 0.8.

The minimum value for the pitch range may be L=3.1 µm, 3.2 µm, 3.5 µm, 3.9 µm, or 4 µm. The upper value of this range may be 6.3 µm, 5.7 µm, 5.5 µm, or 5 µm.

The above-mentioned values for the parameters F and L are given on the basis of non-deformed holes, i.e. holes that do not form part of the first ring of holes, see FIG. 1b.

In order to vary the mean refractive index difference between the fiber core 21 and the silica of the cladding 22, it is also possible to vary the following parameters of the fiber core 21: the fraction of the optical fiber core that is doped with germanium, $F_{doped}/F_{geo}$; and/or the doping profile.

The fraction of the optical fiber core that is doped with germanium may thus be such that:

$$0.5 \leq F_{doped}/F_{geo} \leq 1$$

The doping profile may be uniform over the doped portion. Under such circumstances, f(r)=1 in the germanium-doped zone of the fiber core, such that the relationship:

$$Dn = Dn_{max} * f(r)$$

is written $Dn = Dn_{max}$.

Furthermore, the microstructured optical fiber may have two to ten rings centered on the fiber core. The influence of the number of rings is negligible on mode behavior and on the zero dispersion wavelength of the microstructured optical fiber, given the high values proposed for the ratio F/L in the context of the invention. In known manner, varying the number of rings of air in the fiber seeks merely to make confinement losses negligible.

The precise values for the parameters F and L depend in particular on the pump wavelength of the coherent light source and on the maximum refractive index difference $Dn_{max}$ between the fiber core and the silica of the cladding.

The Applicant has also performed a number of calculations for different dimensioning of microstructured optical fibers.

The influence of the germanium-doping profile has thus been determined. The various profiles concerned are set out in Table 2.

All of the microstructured optical fibers of Table 2 were optimized to obtain a zero dispersion wavelength $1_{ZDW}$ that is matched to the pump wavelength, i.e. in this example, equal or close to 1064 nm.

Table 2 distinguishes between a first category of microstructured optical fibers listed in the "Profile" column by the references 1a, 1b, and 1c, and a second category of microstructured optical fibers listed in the "Profile" column by the references 2a, 2b, and 2c.

The first category provides for a fiber core that is subdivided into two distinct portions, one portion including a uniform distribution of germanium, and the other portion not including any germanium. This distribution of germanium within the core of the fiber is said to be of the "step" type.

The second category provides for a fiber core that is likewise subdivided into two distinct portions, one portion including germanium with a distribution that is not uniform, and the other portion not including any germanium. This is referred to as a "gradient" type distribution.

In both categories, the distinction between the two portions of the fiber core is specified in the column $F_{doped}/F_{geo}$ where $F_{geo}$ is the diameter of the fiber core, and $F_{doped}$ is the diameter of the portion of the fiber core that is doped with germanium.

Thus, in the first category, the refractive index difference between the germanium-doped core and the silica of the cladding is given by:

$$Dn = Dn_{max} = 20'10^{-3}$$

It should be observed that the values for $Dn_{max}$ are given for 632 nm. The measurement apparatus used measures the profile of optical fiber preforms generally performs measurements at 632 nm, by using a red laser. The values of $Dn_{max}$ would be entirely comparable if the measurements had been performed at 1064 nm.

For the second category, the refractive index difference Dn is provided by the relationship:

$$Dn = Dn_{max} * f(r)$$

where $$Dn_{max} = 32'10^{-3} \text{ and } f(r) = 1 - 2(r/F_{doped})^2$$

where $$0 \leq 2r \leq F_{doped}$$

This profile corresponds to that which was implemented in the microstructured optical fiber that was tested experimentally.

In the first category, the variants having the references 1a, 1b, and 1c differ from one another in the value of the parameter $F_{doped}/F_{geo}$. In analogous manner, the variants having references 2a, 2b, and 2c in the second category differ from one another by the value of the parameter $F_{doped}/F_{geo}$.

Here the value of $F_{geo}$ can be determined directly from the first ring of holes, insofar as the calculations summarized in Table 2 were performed on the basis of a microstructured optical fiber in which all of the holes were perfectly circular.

Thus, if a perfect microstructured optical fiber (circular holes) were to be used with a zero dispersion wavelength identical to that shown in FIG. 1b, and with the characteristics specified in Table 1, then it would be necessary to match the pitch L (defined relative to the properties of the holes not forming part of the first ring) to a value L=3.2 μm, with the other parameters (F/L=0.86, $F_{doped}/F_{geo}$=0.66, "gradient"-type doping, and value of $Dn_{max}$) remaining unchanged. The value L=3.2 μm is significantly smaller than the value of the fiber as fabricated, i.e. L=4.7 μm.

Conversely, if the microstructured optical fibers referenced 1a, 1b, 1c, 2a, 2b, and 2c in Table 2 were to be fabricated while retaining the same zero dispersion wavelength in a real structure, then the values for the pitch L would lie, in the real structure, in the range 4.3 μm to 5.7 μm.

The influence of the germanium doping on the effective area values $S_{eff}$, on the non-linear coefficient g of the optical fiber, and on the Raman coefficient $C_R$ are quantified in Table 2 for the fundamental mode.

These values are values calculated at the wavelength of 1064 nm. The method of calculating the non-linear coefficient g of the optical fiber is specified in Appendix 1. The method of calculating the Raman coefficient $C_R$ is specified in Appendix 2.

Thus, doping the core of the microstructured fiber with germanium over half the diameter of the fiber core appears as a preferred solution for enhancing the generation of non-linear effects.

It can be seen that the coefficients g and $C_R$ having the highest values are obtained with structures of the second category. Non-uniform doping of the fiber core thus enhances non-linear effects to a greater extent than uniform doping does. This conclusion can be drawn from Table 2 insofar as the mean refractive index difference in the doped zone of the fibers of the second category is comparable to the maximum refractive index difference $Dn_{max}=20'10^{-3}$ considered for the fibers of the first category.

By way of comparison, Table 2 has a row relating to a microstructured optical fiber described in "*Extended blue supercontinuum generation in cascaded holey fibers*", J. C. Travers et al., Optics Letters, Vol. 30, Issue 13, pp. 3132-3134 (December 2005) comprising a fiber core of non-doped silica, for which the non-linear coefficient g and the Raman coefficient $C_R$ were calculated for the wavelength 1064 nm in the manner specified in Appendices 1 and 2.

It is of interest to observe that the presence of germanium enables the value of the non-linear coefficient g to be multiplied by a factor lying in the range 2 to 4 compared with the optical fiber described by J. C. Travers et al., and multiplies the value of the Raman gain $C_R$ by a factor lying in the range 3 to 7.

Figures 5A, 5B:
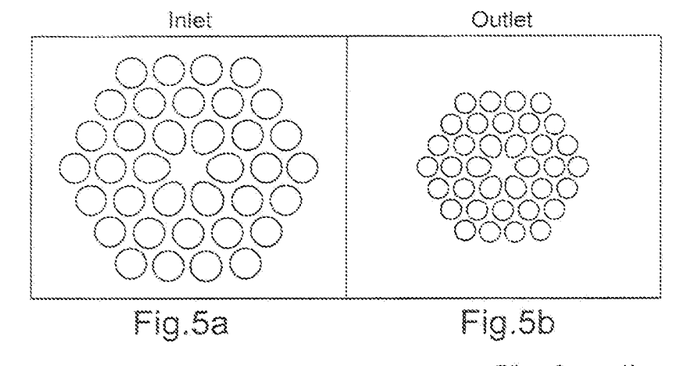
FIGS. 5a and 5b, shows a microstructured optical fiber of overall section that varies along the optical fiber, its other characteristic parameters corresponding to those of the fiber of FIG. 1, FIG. 5a being a cross-section view at the inlet of the fiber and FIG. 5b being a cross-section view at the outlet of the fiber.

FIG. 5 shows a variant embodiment of the invention in which the section of the microstructured optical fiber varies continuously along the optical fiber (a "taper" fiber), its other characteristic parameters corresponding to those of the fiber of FIG. 1. More precisely, FIG. 5a is a cross-section view at the inlet to the fiber and FIG. 5b is a cross-section view at the outlet of the fiber.

The overall section of the fiber decreases along the fiber while the ratio F/L is conserved. Incidentally, this dimensioning implies that the diameter of the fiber core decreases along the fiber. Consequently, this fiber enables the zero dispersion wavelength to be decreased on advancing along the axis of the fiber.

This fiber enhances a little more the generation of an optical signal propagating in the short wavelength range, extending towards the blue.

Figure 6:
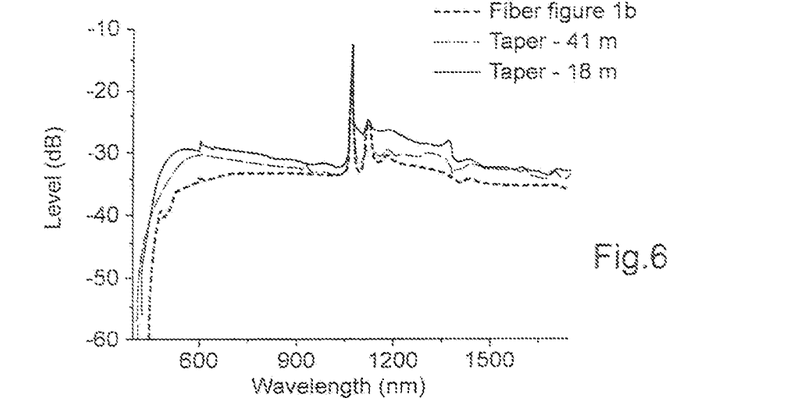
FIG. 6 compares the variation as a function of wavelength in the signal level obtained at the outlet from the microstructured optical fiber of FIG. 1 with that of the signal obtained at the outlet from the microstructured optical fiber of FIG. 5.

The experimental data given in FIG. 6 confirms this. FIG. 6 plots variation in the level of the signal obtained at the outlet from the microstructured optical fiber of FIG. 1 and variation in the level of the signal obtained at the outlet from the microstructured optical fiber of FIG. 5, as a function of wavelength.

For example, FIG. 6 shows the results obtained with microstructured optical fibers having an outside diameter that varies over a length of 18 meters ("taper—18 m") and over a length of 41 meters ("taper—41 m"). The outside diameter of those tapering fibers, referenced "taper—18 m" and "taper—41 m" thus decreases regularly from the inlet to the outlet.

More precisely, for these two fibers, the outside diameter varied from 200 μm (inlet) to 125 μm (outlet), giving a ratio of 0.625. The fiber core diameter $F_{geo}$, the hole diameter F, and the pitch L between two neighboring holes all vary in the same manner, insofar as the ratio F/L remains constant all along the fiber.

It can thus be seen that using a tapering microstructured optical fiber of diameter that decreases in the light propagation direction significantly improves the power conveyed by the fiber at short wavelengths, typically in the visible wavelength range, i.e. 430 nm to 700 nm.

For example, it is possible to obtain an improvement of up to 6 dB at the wavelength of 525 nm using the microstructured optical fiber referred to as "taper—18 m".

Furthermore, using a tapering microstructured optical fiber of diameter that decreases relative to the propagation direction of the light makes it possible to broaden the wavelength band at the outlet from the microstructured optical fiber, since the spectrum extends a little further towards the blue. The microstructured optical fiber referred to as "taper—18 m" enables the spectrum to be broadened towards the blue by about 22 nm.

The use of a microstructured optical fiber of diameter that tapers in the propagation direction of the light thus significantly improves the performance of the microstructured optical fiber of FIG. 1b.

Figure 7:
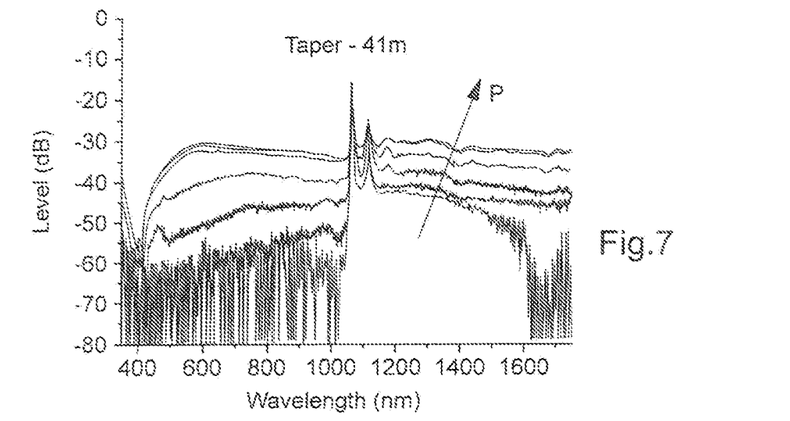
FIG. 7 shows the influence of the power delivered by the coherent light source on the variation as a function of wavelength in the level of the signal obtained at the outlet from the microstructured optical fiber of FIG. 5.

FIG. 7 shows the influence of the power delivered by the coherent light source on the variation in the signal level obtained at the outlet from the microstructured optical fiber of FIG. 5, as a function of wavelength.

The level of the power recovered at the outlet from the microstructured optical fiber increases, logically, with increasing power delivered by the coherent light source 10.

Nevertheless, it is of interest to observe that the power delivered by the coherent light source also influences the flatness of the white light source at the outlet from the fiber, in particular at short wavelengths, typically lying in the range 450 nm to 700 nm (FIG. 7).

Furthermore, there appears to be a minimum peak power level for the pulses emitted by the white light source, above which the flatness of the spectrum obtained at the outlet from the microstructured optical fiber at such short wavelengths is considerably improved. This minimum power level may be estimated as being 3 kW per pulse in order to obtain acceptable flatness.

The length of the tapering portion of suitable fibers may lie in a range 5 m to 50 m. The two above-mentioned values of 18 m and 41 m are therefore not restrictive.

Furthermore, the ratio of the outside diameter of the fiber at its outlet over its outside diameter at its inlet may lie more generally in the range 0.4 to 0.8, and is therefore not limited to the value of 0.625.

APPENDIX 1

Calculating the Non-Linear Coefficient g of the Fiber

In step index fibers, the non-linear coefficient g per watt per kilometer ($W^{-1} \cdot km^{-1}$) for a light propagation mode is commonly calculated in order to quantify its non-linear nature. The effectiveness of non-linear effects depends not only on the non-linear index, but also on light intensity, and thus on light confinement.

$$\gamma = \frac{n_2 \omega}{c S_{eff}} \quad (R1)$$

where:

$n_2$ is the non-linear index coefficient of the medium, w is angular frequency, $S_{eff}$ is the effective area of the propagation mode under consideration, c is the speed of light.

Depending on whether the fiber is doped or not doped, and when doped depending on the way in which doping is performed (uniform, gradient, over a fraction of the fiber core only or over the entire section of the fiber core), the way in which the non-linear index $n_2$ is calculated can take different forms.

1.1 Non-Linear Index Coefficient $n_2$ for a Light Propagation Mode of Silica that is not Doped or that is Doped Uniformly with Germanium In order to determine the non-linear index of silica that is not doped or that is doped uniformly with germanium, the empirical relationship given in [1] is used:

$$n_2(10^{-20} \, m^2/W) \cong 2.507 + 0.505\Delta \quad (R2)$$

where:

$$\Delta = \frac{(n_1^2 - n_0^2)}{2n_1^2} \, (\text{in } \%)$$

with:

$n_0$: refractive index of pure silica, $n_1$: refractive index of doped silica.

To obtain the non-linear coefficient g, relationship (R1) is used. These calculations can be applied in particular to obtain the "Profile 0*" data of Table 2.

Nevertheless, relationship (R2) does not enable non-linear indices to be calculated for modes that propagate in a plurality of media having different values for $n_2$.

This applies to air-silica microstructured fibers that possess a germanium-doped core over a fraction of the fiber core, as summarized in Table 2, and for which the distribution is either uniform ("step") or non-uniform ("gradient").

Under such circumstances, relationship (R3) below is used to determine the non-linear index $n_2$.

1.2 Calculating the Mean Non-Linear Index Coefficient of the Germanium-Doped Silica of Table 2

$$n_2 = \frac{\int_{-\infty}^{+\infty} \int_{-\infty}^{+\infty} n_2(x,y) |E(x,y)|^4 dx dy}{\int_{-\infty}^{+\infty} \int_{-\infty}^{+\infty} |E(x,y)|^4 dx dy} \quad (R3)$$

where:

$n_2(x,y)$ represents local variation in the non-linear index as a function of the coordinates (x,y); and E(x,y) represents the electric field as a function of the same coordinates (x,y).

The local variation in the non-linear refractive index $n_2(x,y)$ is determined using relationship (R2), it being understood that the distribution of the refractive index $n_1(x,y)$ in a section of the optical fiber is known by the design of the optical fiber preform.

Relationship (R3) is adapted to structures in accordance with the invention as presented in Table 2 by weighting the non-linear coefficients by the intensity of the electric field in each medium [1].

In order to obtain the non-linear coefficient g, relationship (R1) is then used.

It should be observed that the variations in $n_2$ with wavelength are negligible since they vary in proportion to 1/n, where n is the refractive index of the medium [2].

REFERENCES

[1] *Dopant dependence of effective non-linear index in $GeO_2^-$ and $F^-$ doped core single mode fibers*, K. Nakajima and M. Ohashi, Photonics Technology Letters, Vol. 14, No. 4, 2002, pp. 492-494.

[2] *Modeling of non-linear coefficient of optical fibers*, by P. Sillard, P. Nouchi, J-C. Antona, and S. Bigo, Optical Fiber Conference 2005, paper OFH4.

APPENDIX 2

Calculating the Raman Coefficient $C_R$ of a Fiber

For pure or germanium-doped silica, the empirical relationship (R4) given in [3] was used to evaluate the Raman gain of the material at a wavelength l=1.55 µm:

$$g(x,y) = g_0 \cdot (1 + A \times (n_1(x,y) - n_0)) \quad (R4)$$

where:

$g_0 = 27.5 \, \mu m^2 \cdot W^{-1} \cdot km^{-1}$, corresponding to the gain of pure silica, A=54.4 (no units), $n_1(x,y)$ is the refractive index of the material at coordinates (x,y), and $n_0$ is the refractive index of pure silica at the wavelength under consideration l=1.55 µm.

To calculate the Raman gain $G_R$ of pure or silica-doped germanium at a different wavelength, it suffices to take account of the way this parameter varies with 1/l as described in [4], in application of the following relationship (R5):

$$G_R(\lambda) = G_R(1.55 \, \mu m) * 1.55/\lambda \quad (R5)$$

where l is expressed in micrometers.

Thereafter, to determine the Raman coefficient $C_R$ as expressed in Table 2, the electric field distribution in the microstructured optical fiber is taken into account in a manner similar to that mentioned at point 1.2 in Appendix 1.

Thus, the Raman coefficient of a propagation mode having an effective area $S_{eff}$ is written:

$$C_R(W^{-1} \cdot km^{-1}) = \frac{\int_{-\infty}^{+\infty}\int_{-\infty}^{+\infty} g(x,y)|E(x,y)|^4 dx dy}{\int_{-\infty}^{+\infty}\int_{-\infty}^{+\infty}|E(x,y)|^4 dx dy} \times \frac{1}{S_{eff}}$$

To perform the above calculations, it is assumed that the overlap between the pump wave and the signal wave conveying the Stokes wave is total.

The maximum of the Raman gain is obtained when there is a difference of 13.3 terahertz (THz) between the frequency of the pump wave and the frequency of the wave conveying the optical signal, i.e. 50 nm for a pump wavelength of about 1 µm.

REFERENCES

[3] *Effective Raman gain characteristics in germanium and fluorine doped optical fiber* by C. Fukai and al., Optics Letters, Vol. 29, No. 6, pp. 545-547.
[4] *Theory of dielectric optical waveguides* by D. Marcuse, Academic Press, 1974.

TABLE 1

| | Microstructured cladding | | | Germanium doped core | | | |
|---|---|---|---|---|---|---|---|
| Profil | Pitch Λ µm | Diameter ϕ µm | ratio ϕ/Λ no unit | Geometrical core diameter ϕ geo µm | Doped Diameter ϕ doped µm | ratio ϕ doped/ ϕ geo no unit | $\Delta n_{max}$ no unit | Type |
| 3 | 4.70 | 4.00 | 0.86 | 3.85 | 2.50 | 0.66 | $32 \cdot 10^{-3}$ | gradient |

TABLE 2

| | Microstructured cladding | | | Germanium doped core | | | | Properties at 1.064 µm | | |
|---|---|---|---|---|---|---|---|---|---|---|
| Profil | Pitch Λ µm | Diameter ϕ µm | ratio ϕ/Λ | Geometrical core diameter ϕ geo µm | Doped Diameter ϕ dopé µm | ratio ϕ dopé/ ϕ geo | $\Delta n_{max}$** no unit | Type | Effective area $A_{eff}$ µm² | Non linear coefficient γ $W^{-1} \cdot km^{-1}$ | Raman coefficient Cr $W^{-1} \cdot km^{-1}$ |
| 0* | 2.97 | 1.16 | 0.39 | 4.78 | non dope | — | — | — | 13.6 | 10.8 | 2.9 |
| 1a | 3.28 | 2.62 | 0.80 | 3.94 | 1.97 | 0.500 | $20 \cdot 10^{-3}$ | step | 5.5 | 33.2 | 14.3 |
| 1b | 3.60 | 2.88 | 0.80 | 4.32 | 2.70 | 0.625 | $20 \cdot 10^{-3}$ | step | 6.8 | 27.7 | 12.2 |
| 1c | 4.00 | 3.20 | 0.80 | 4.80 | 3.60 | 0.750 | $20 \cdot 10^{-3}$ | step | 9.1 | 20.6 | 9.1 |
| 2a | 2.94 | 2.35 | 0.80 | 3.53 | 1.76 | 0.500 | $32 \cdot 10^{-3}$ | gradient*** | 4.6 | 40.5 | 21.5 |
| 2b | 3.00 | 2.40 | 0.80 | 3.60 | 2.25 | 0.625 | $32 \cdot 10^{-3}$ | gradient*** | 4.6 | 41.7 | 15.8 |
| 2c | 3.15 | 2.52 | 0.80 | 3.78 | 2.84 | 0.750 | $32 \cdot 10^{-3}$ | gradient*** | 5.1 | 38.8 | 15.1 |

*see J. C. Travers et al.
**value at 632 nm
***$\Delta n = \Delta n_{max} * (1 - (2r/\Phi_{dopé})^2)$

What is claimed is:

1. A microstructured optical fiber for generating broadband white light, the fiber comprising a fiber core doped with germanium and silica cladding surrounding the fiber core, the cladding including a plurality of holes arranged in the form of a regular mesh, wherein the diameter F of a hole in the cladding, the pitch L between the respective centers of two neighboring holes in the cladding, and the refractive index difference Dn between the germanium-doped fiber core and the silica of the cladding are such that $0.6 \leq F/L \leq 1$ $3 \ \mu m \leq L \leq 6.5 \ \mu m$, and $Dn = Dn_{max} * f(r)$ with $Dn_{max}$, i.e. the maximum refractive index difference between the germanium-doped fiber core and the silica of the cladding, being such that $10 \times 10^{-3} \leq Dn_{max} \leq 40 \times 10^{-3}$ and f(r) being a function for the distribution of germanium-doping within the fiber core depending on the radius r of said core, such that the fiber is configured to generate a white light supercontinuum that is only supported by fundamental mode over a wavelength band having a width of at least 1000 nm.

2. A microstructured optical fiber according to claim 1, wherein the fraction of the germanium-doped optical fiber core is such that $0.5 \leq F_{doped}/F_{geo} \leq 1$ where $F_{doped}$ is the diameter of the germanium-doped fiber core and $F_{geo}$ is the diameter of the fiber core, which diameter is defined as being the diameter of the circle tangential to the first ring of holes surrounding the fiber core.

3. A microstructured optical fiber according to claim 1, wherein the distribution function is defined by the relationship f(r)=1, such that the germanium is distributed uniformly over the diameter $F_{doped}$ of the doped fiber core.

4. A microstructured optical fiber according to claim 1, wherein the concentration of germanium is selected so that the refractive index difference $Dn = Dn_{max}$ between the germanium-doped fiber core and the silica of the cladding lies in the range $15 \times 10^{-3}$ and $25 \times 10^{-3}$.

5. A microstructured optical fiber according to claim 1, wherein the germanium is distributed non-uniformly.

6. A microstructured optical fiber according to claim 1, wherein: the maximum refractive index difference $Dn_{max}$ between the germanium-doped fiber core and the silica of the cladding is such that $25 \times 10^{-3} \leq Dn_{max} \geq 40 \times 10^{-3}$ and preferably $Dn_{max} = 32 \times 10^{-3}$; and the distribution function $f(r)$ is written $f(r) = 1 - (2r/F_{doped})^2$ where $0 \leq 2r \leq F_{doped}$.

7. A microstructured optical fiber according to claim 1, wherein the diameter $F_{geo}$ of the fiber core decreases along the fiber over at least a portion thereof, with the ratio F/L being conserved all along the fiber.

8. A microstructured optical fiber according to claim 7, wherein the ratio of the fiber core diameter at the outlet from the fiber over the fiber core diameter at the inlet to the fiber lies in the range 0.4 to 0.8.

9. A device for generating broadband white light, comprising:
   a microstructured optical fiber according to claim 1; and
   a coherent light source emitting light at a pump wavelength l of value that is matched to the zero dispersion wavelength $l_{ZDW}$ of the microstructured optical fiber, i.e. for which $l = l_{ZDW} \pm 50$ nm, so that it generates white light on the fundamental mode over a wavelength band having a width of at least 1000 nm.

10. A device for generating broadband white light according to claim 9, wherein the coherent light source emits ultrashort pulses lying in the range 20 ps to 3 ns.

11. A device for generating broadband white light according to claim 10, wherein the pulses present peak power lying in the range 0.5 kW to 200 kW.

12. A device for generating broadband white light according to claim 10, wherein the coherent light source emits pulses at a repetition frequency lying in the range 1 Hz to 100 MHz.

13. A device for generating broadband white light according to claim 10, wherein the wavelength of the light source is 1064 nm, such that the device generates white light on the fundamental mode over a wavelength bandwidth occupying at least the range 450 nm to 1700 nm.

* * * * *

UNITED STATES PATENT AND TRADEMARK OFFICE
CERTIFICATE OF CORRECTION

| | | |
|---|---|---|
| PATENT NO. | : 8,699,833 B2 | Page 1 of 1 |
| APPLICATION NO. | : 12/855116 | |
| DATED | : April 15, 2014 | |
| INVENTOR(S) | : Gilles Melin | |

It is certified that error appears in the above-identified patent and that said Letters Patent is hereby corrected as shown below:

In the Claims

In column 19, line 6, change the ≥ symbol to a ≤.

Signed and Sealed this
Twenty-second Day of July, 2014

Michelle K. Lee
*Deputy Director of the United States Patent and Trademark Office*